Jan. 26, 1960   W. H. FAULKNER, JR., ET AL   2,922,888
RADIATION THICKNESS MEASUREMENT
Filed Sept. 27, 1955

WILLIAM HARRISON FAULKNER JR.
JAMES W. SHEARER
*INVENTORS*

BY *Spencer E. Olson*
ATTORNEY

United States Patent Office 2,922,888
Patented Jan. 26, 1960

2,922,888
RADIATION THICKNESS MEASUREMENT

William Harrison Faulkner, Jr., Weston, and James W. Shearer, Lexington, Mass., assignors to Tracerlab, Inc., Boston, Mass., a corporation of Massachusetts Application September 27, 1955, Serial No. 536,889

3 Claims. (Cl. 250—83.6)

This invention relates to apparatus for measuring the weight per unit area and hence the thickness of homogeneous sheet materials, and is more particularly concerned with means for compensating for drifts and errors in radiation-type thickness gauges occasioned by changes in temperature, humidity and atmospheric pressure of the air column separating the source and detector.

In a radiation-type thickness gauge of the absorption type, a source of penetrative radiation is disposed on one side of the material to be measured and a detector yielding an output current which is a function of incident radiation is placed on the other side thereof, opposite the source. Radiation is absorbed by the material in a manner now well known in the art, the degree of absorption being a measure of the weight per unit area of such material, and where the material is homogeneous the gauge may be calibrated directly to indicate thickness. The source and detector are separated to permit passage of the material therebetween without contacting either source or detector, and consequently, the radiation emanating from the source traverses an air column of predetermined length, in addition to the sheet material, before reaching the detector. Thus, in addition to absorption of radiation in the sheet material, there is appreciable absorption in the air column, which of course, results in an indication of a greater weight per unit area than that of the sheet material alone. The length of the air column is substantially constant for a particular gauge design, a feature which would seem to permit of easy compensation for air column effects, but unfortunately the weight per unit area of the air column is not constant but varies with the humidity, temperature, atmospheric pressure of the air, and the presence of dust, fumes and the like in the air column also have an effect. The effect of temperature is the most marked, the air column density, for each inch of air column at room temperature, varying about .012 mg./cm.$^2$ per degree centigrade. Thus, for a one inch air column, to maintain 1% accuracy in the measurement of the thickness of paper of the type on which this is written, which is approximately 6 mg./cm.$^2$, it is necessary to hold the temperature of the air column within 6° centigrade. When equilibrium conditions are reached, maintenance of this tolerance is normally not difficult, but during periods of start-up and shutdown, the error in measured weight per unit area due to temperature variations may be very serious. Variations in humidity have a lesser effect on the air column density, the variation being about 0.0011 mg./cm.$^2$ per percent change in relative humidity at 20° C. per inch of air column. Pressure variations cause a variation of 0.005 mg./cm.$^2$ per mm. Hg change in barometric pressure per inch of air column, and while not normally introducing errors of serious magnitude, there are occasions, as for example, during severe storms, when the barometric pressure changes appreciably from normal. Thus, it is seen that air column effects are a very real problem inherent in radiation-type thickness gauges, and must be compensated for to provide measurement with suitable accuracy.

Heretofore, compensation for air column effects has been attempted by withdrawing the source and detector to the edge of the sheet material, and setting the controls of the gauge to an established zero position, which largely compensates for variations in the air column. This method has the disadvantage, however, that the air at the edge of the sheet is normally at a different temperature than that directly adjacent the sheet. This arises from the fact that in the great majority of gauging applications, the sheet material is hot, with the result that the air directly above the sheet is considerably hotter than the air at the edge of the sheet. Moreover, this scheme of compensation is ordinarily carried out only periodically, for example, at 30 minute intervals, whereby variations occurring during the period between standardization are not compensated.

Having an appreciation of the foregoing shortcomings of prior art gauges, applicants have as an object of the present invention to provide apparatus for measuring the weight per unit area of sheet material by a radiation technique wherein the characteristics of the air column between the source and detector may vary considerably without substantially affecting the accuracy of measurement of the sheet material.

Another object of the invention is to provide apparatus for measuring the weight per unit area of sheet material by a radiation transmission technique in which measurement of unabsorbed radiation is independent of air column effects.

Another object of the invention is to provide a radiation-type thickness gauge wherein effects of variations in the air column which the radiation traverses are continuously compensated.

With the foregoing objects and other which will hereinafter appear, the invention is featured by the provision in a transmission-type radiation thickness gauge of two radiation sources for emitting penetrative radiation, and two radiation detectors each arranged to receive radiations from a different one of the sources and spaced a different distance from its corresponding source. The material to be gauged is passed between the sources and detectors, whereby the radiation from the sources traverses the material, and also passes through air columns of different lengths before reaching its respective detector. Consequently, the output signals of the two detectors are dependent on the weight per unit area of the sheet material and also on the "weight" of the air column separating the detector from its respective source. In accordance with the invention, the output signals of the two detectors are combined in such proportions, related to the difference in spacing of the sources and their respective detectors, that the resultant signal is independent of air column variations and a function only of variations in weight per unit area of the sheet material.

The novel features that are considered characteristic of the invention are set forth with particularity in the appended claims. The invention itself, however, both as to its organization and its method of operation, together with further objects and advantages thereof will best be understood by reference to the following description and to the drawings, in which:

Figure 1:
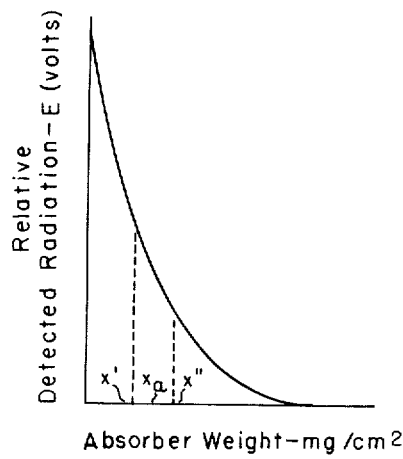
Fig. 1 is a typical absorption curve which illustrates the absorption of radiation in matter as a function of the weight per unit area of the matter.

In the usual absorption-type thickness gauge, radiation emanating from a suitable radioactive source is directed through the material being measured, the unabsorbed radiation emerging from the other side being an exponential function of the weight per unit area of the material. This relationship is shown in Fig. 1, where absorber weight is plotted on the horizontal axis, and relative detected radiation, which may be expressed in terms of ionization current or as a potential developed across a resistor by the flow of the ionization current therethrough, is plotted on the vertical axis. The curve approximates the general equation $$E = e^{-\mu x}$$

where $\mu$ is known as the mass absorption coefficient, expressed in cm.$^2$/mg., and $x$ is the weight per unit area, expressed in mg./cm.$^2$, the value of $\mu$ being primarily dependent on the nature of the radiation from the radioactive source. While this curve is generally exponential, the weight per unit area for any particular gauge application is normally a substantially constant predetermined value, the function of the gauge being to measure deviations from such value. That is, the sheet material may have a desired weight of $x_a$, with expected deviations from this value downward to $x'$ and upward to $x''$ as indicated on the curve. This range of operation has been exaggerated for clarity, but it will be apparent that over this limited range, the absorption curve is essentially linear, a feature which is availed of in the present invention, and the significance of which will appear hereinafter.

The theory of operation of the present invention will be explained by reference to the schematic diagram of Fig. 2, the essentials of the gauge being two radioactive sources 10 and 11, arranged to direct radiations through a sheet of material 12 whose weight per unit area is to be measured, and two radiation detectors, which preferably take the form of ionization chambers 13 and 14. Each of ionization chambers 13 and 14 is energized from a suitable voltage supply connected to terminals 17 and 18, respectively, the ionization chambers being operative, as is well known, to produce ionization currents, designated $i_1$ and $i_2$, of a magnitude proportional to the radiation incident thereon.

Figure 2:
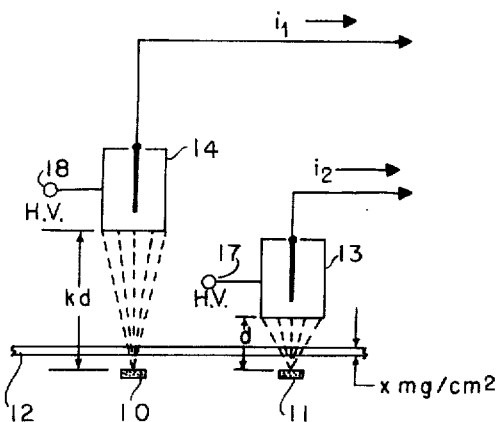
Fig. 2 is a schematic diagram illustrating the principle of the invention.

As shown in Fig. 2, the air column between source 11 and detector 13 has a length, $d$, while the air column between source 10 and detector 14 has a greater length, $kd$, $k$ being an arbitrary constant, which preferably is not too near to unity. Accordingly, if the "weight" of the air in the column 11—13, is designated by $w = \rho d$ mg./cm.$^2$, then the "weight" of the air in the column 10—14 equals $kw$, where $\rho$ is the density of the air in the column in mg./cm.$^2$, each of which varies with temperature, pressure and humidity as above-described. For purposes of the following discussion, the weight of sheet material 12 will be designated $x$ mg./cm.$^2$.

It will now be shown that the configuration of Fig. 2 is effective to compensate for air column variations while indicating variations in the weight per unit area, $x$, of the sheet material under test. The equations for the currents $i_1$ and $i_2$, can be written as follows:

$$i_1 = \frac{\epsilon_{14} S_{10}}{(kd)^2} e^{-\mu x} e^{-\mu \rho k d} \quad (1)$$

$$i_2 = \frac{\epsilon_{13} S_{11}}{d^2} e^{-\mu x} e^{-\mu \rho d} \quad (2)$$

where $i_1$ and $i_2$ are respectively the currents in amperes from detectors 14 and 13, $\epsilon_{14}$ and $\epsilon_{13}$ are dimensionless factors denoting the efficiencies of the two detectors, $S_{10}$ and $S_{11}$ are the source strengths in curies of source 10 and 11, $\mu$ is the mass absorption coefficient in cm.$^2$/mg. (which is assumed to be constant), $\rho$ is the air density in mg./cm.$^3$, $d$ and $kd$ are the air gap lengths in cm. depicted in Fig. 2, and $x$ is the weight per unit area of sheet material 12 in mg./cm.$^2$. The exponential terms of Equations 1 and 2 are of the general form $e^{-t}$ which may be expressed as the expansion $$e^{-t} = 1 - t - \frac{t_2}{2!} - \frac{t_3}{3!} \cdots \frac{t_n}{n!} \quad (3)$$

and in view of the contemplated operation of the gauge over a limited region where the absorption curve (Fig. 1) may be considered linear, the linear terms only of the expansion may be used without appreciable loss of accuracy. Thus, the following equation can be written for small changes $\Delta i$ in current from the two detectors due to small changes in $x$ and $\rho$:

$$\Delta i_1 = i_1 (-\mu \Delta x - \mu k d \Delta \rho) \quad (4)$$
$$\Delta i_2 = i_2 (-\mu \Delta x - \mu d \Delta \rho) \quad (5)$$

which, it will be noted, both include the desired variable $\Delta x$, and the undesired variable $\Delta \rho$.

To facilitate analysis of Equations 4 and 5 it will be desirable first to consider a more general case of simultaneous equations of that form. Thus, given two simultaneous equations $$ax + by = m \quad (6)$$
$$Ax + By = M \quad (7)$$

where $x$ and $y$ are variables and the other symbols are constant, solution for $x$ may be accomplished by writing:

$$aBx + bBy = mB \quad (8)$$
$$Abx + Bby = Mb \quad (9)$$

and by subtraction, there is obtained $$x(aB - Ab) = mB - Mb \quad (10)$$

Solving for $x$:

$$x = \frac{m - M\frac{b}{B}}{a - A\frac{b}{B}} \quad (11)$$

which may be written in a number of alternate forms, thus $$x = \frac{m - M\frac{b}{B}}{a - A\frac{b}{B}} = \frac{m\frac{B}{b} - M}{a\frac{B}{b} - A}, \text{ etc.} \quad (12)$$

In the physical situation of Fig. 2, $m$ and $M$ of Equation 12 are construed as the two currents which are to be measured, $x$ as the variable desired to be indicated, and $y$ as the undesired variable. Thus, Equations 4 and 5 above are in the form of Equations 6 and 7, where $\Delta x$ replaces $x$ and $\rho$ replaces $y$. By analogy, the solution for $\Delta x$ in Equations 4 and 5 is:

$$\Delta x = \frac{\mu k d i_1 \Delta i_2 - \mu d i_2 \Delta i_1}{\mu^2 d i_1 i_2 - \mu^2 k d i_1 i_2} \quad (13)$$

$$\Delta x = \frac{\left(\frac{k i_1}{i_2}\right) \Delta i_2 - \Delta i_1}{\mu i_1 (1 - k)} \quad (14)$$

Equation 14 clearly indicates that variations in $x$, the quantity usually measured in thickness gauges of the present type, may be measured by a combination of currents $i_1$ and $i_2$ (the quantities $k$ and $\mu$ are constant), and are independent of variations in the density $\rho$ of the air column.

Figure 3:
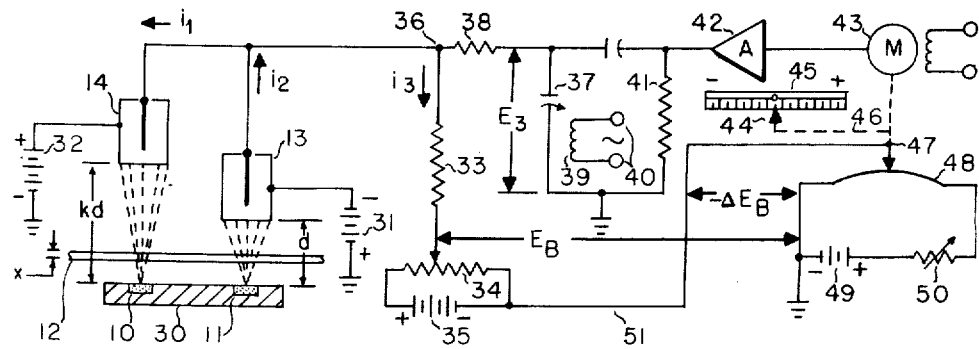
Fig. 3 is a circuit diagram, partially in schematic form, illustrating the invention embodied in one form of thickness gauge circuit.

Referring to Fig. 3, in which like numerals are employed to identify parts common with Fig. 2, there is schematically illustrated a circuit for combining the signals $i_1$ and $i_2$ so that the resultant will be given by Equation 14. Two sources 10 and 11 are mounted in a suitable source housing, diagrammatically shown at 30, and two ionization chambers 13 and 14 are positioned on the opposite side of sheet material 12 and respectively spaced from its corresponding source by distances $d$ and $kd$. The source and ionization chambers are supported by rigid supporting means (not shown) so as to maintain the spacings therebetween substantially constant. The ionization chambers are substantially identical in construction, each having an outer cylindrical electrode containing an ionizable medium, e.g., air or a suitable gas, and an inner electrode. Chamber 13 is energized from a source of direct current potential, represented as a battery 31, of a polarity to impress a negative voltage on the outer cylindrical electrode, and ionization chamber 14 is energized from a second battery 32, of opposite polarity, to apply a positive potential on the outer electrode. Without describing the operation of the ionization chambers, which is well known, the energization of the two detectors with opposite polarity causes current flow therefrom in opposite directions, as indicated by the arrows labeled $i_1$ and $i_2$, in response to incident radiation. Sources 10 and 11 being of substantially constant intensity (except for radioactive decay), the magnitudes of currents $i_1$ and $i_2$ vary with variations in the weight per unit area of sheet material 12 in accordance with the curve of Fig. 1, and are also subject to variation due to air column changes.

The inner electrodes of ionization chambers 13 and 14 are connected together and to one terminal of load resistor 33, whereby currents $i_1$ and $i_2$ are differentially applied thereto, the resultant current therethrough being designated on the drawing as $i_3$. For proper operation of this circuit the resistance of resistor 33 is preferably much lower in value than the equivalent resistance of the two ionization chambers 13 and 14. When a difference in magnitude exists between the two currents $i_1$ and $i_2$, the resultant current $i_3$ develops a potential across resistor 33 which may be amplified and/or recorded. Assuming a voltmeter to be connected across resistor 33, the meter is set to zero when $i_3=i_2-i_1=0$. Any deviation $\Delta i_3$ is then given by $\Delta i_3 = \Delta i_2 - \Delta i_1$. In order for Equation 14 to be equivalent to this the following condition must obtain:

$$k \frac{i_1}{i_2} = 1$$

thus imposing an additional condition on the physical set up of the sources and detectors.

In terms of the physical parameters of the system this additional condition can be written as follows:

$$\frac{\frac{k\epsilon_1 S_1}{(kd)^2} e^{-\mu x} e^{-\mu \rho k d}}{\frac{\epsilon_2 S_2}{d^2} e^{-\mu x} e^{-\mu \rho d}} = \frac{i}{k} \frac{\epsilon_1}{\epsilon_2} \frac{S_1}{S_2} (e^{-\mu \rho d})^{k-1} = 1 \qquad (15)$$

This condition is established when the gauge is set up, and may be done by choosing a convenient variable such as $k$, $\epsilon$ or $S$, and measuring the change in $i_3$ as a function of the change in $\rho$. For example, one or both of the ionization chambers 13 and 14 may be provided with a movable diaphragm, or the like, to alter the detection efficiency $\epsilon$, or one or both of the sources 10 and 11 may be provided with a shutter having an aperture of controllable area to adjust the effective source strength of one or both of the sources. One or both of these parameters are changed until $\Delta i_3/\Delta \rho = 0$, $\rho$ being conveniently varied by blowing hot air through the gaps between the sources and detectors.

In a practical gauge, it is desirable to record variations in the weight per unit area of the sheet material, rather than simply indicating them on a meter, so it is necessary to produce an output signal which has the properties of $i_3$, but also being zero for $x=0$. To obtain a signal having these characteristics, which will hereinafter be designated $E_3$, it is necessary to combine the difference voltage developed across resistor 33, designated $E_D$, with a bucking voltage, $E_B$, such that the following relationship always exists between the several voltages: $E_3 = E_D - E_B$ with $E_3 = 0$ when $\Delta x = 0$. For this to be true, $E_B$ is made equal to $E_D$ at the desired weight per unit area, $x_a$, of the sheet material 12, with the conditions of Equation 15 established. Since the gauge is calibrated to be independent of variations in the density, $\rho$, of the air gap, $E_3$ is thus a function of $\Delta x$ only, and goes to zero when $\Delta x = 0$.

Figure 4:
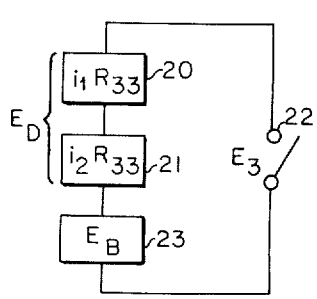
Fig. 4 is a diagram illustrating the manner in which various voltages are combined in the system of Fig. 2 to achieve the objects of the invention.

A general arrangement for combining the signals $i_1$, $i_2$ and $E_B$ is schematically represented in Fig. 4, where blocks 20 and 21 respectively represent potentials corresponding to $i_1 R_{33}$ and $i_2 R_{33}$ which are combined as above-described to provide a signal $E_D$, which in turn, is opposed by a bucking voltage $E_B$, represented by block 23, whereby the desired signal $E_3$ is derived across terminals 22.

In the practical circuit of Fig. 4, the bucking voltage $E_B$ is derived from potentiometer 34, across which is connected a battery 35, the movable tap of the potentiometer being connected to resistor 33 whereby the voltage at the tap opposes the voltage developed across resistor 33. It will be noted that the voltage $E_B$ is measured between the movable tap and ground. Thus, the resultant potential appearing at point 36, measured with respect to ground, is equal to $E_3$. This voltage could simply be measured with a suitable voltmeter to obtain an indication of the weight per unit area of material 12, but it is normally more desirable to indicate and/or continuously record variations in weight from a fixed weight. To this end, the signal at 36 is amplified and recorded utilizing suitable circuitry. In the disclosed embodiment, the direct current signal is coupled to a dynamic condenser 37, via isolating resistor 38, where it is converted to an alternating signal to permit amplification with an alternating current amplifier, thereby to eliminate the well-known difficulties encountered with the use of direct current amplifiers with minute direct current signals. As is well-known, the vibrating condenser 37 is driven at a predetermined frequency, e.g., 60 cycles, by suitable means, illustrated as a coil 39 energized from a suitable source connected to terminals 40. The resultant A.C. signal developed across resistor 41 is applied to A.C. amplifier 42, the output of which is coupled to and is utilized to energize one phase of a 2-phase recorder balancing motor 43. The other phase of the motor is energized from the same supply as is used to drive dynamic condenser 37. Thus, when $E_3 = 0$, indicating no deviation in weight from standard, there is no rotation of motor 43, but when $E_3$ varies by an amount $\Delta E_3$, motor 43 will be rotated. The motor 43 drives the indicator 44 and/or pen (not shown) along the recorder scale 45, as indicated by dotted line 46, and also drives the contact 47 on a balancing slidewire, diagrammatically indicated at 48. A battery 49 and variable resistor 50 are serially connected in parallel with slide-wire 48 whereby a balancing signal may be derived from contactor 47, the contactor being connected via connection 51 to the negative terminal of potentiometer 34.

With a material of "standard" weight, $x_a$ in the gauge, $E_B$ is adjusted on potentiometer 34 so that $E_3 = 0$, indicator 44 is positioned at the center of the scale 45, and contactor 47 is positioned near the center of slide-wire 47. Resistor 50 is then adjusted such that the potential between contactor 47 and ground is equal to zero. If then, there is a variation in the weight of sheet 12, the value of $i_3$ is changed, tending to change the value of $E_3$. This results in rotating of motor 43 in a direction dependent upon whether there is an increase or decrease in $E_3$, and movement of indicator 44 from the center in a direction depending on the rotation of the motor to establish a new condition of balance of the recorder. That is, the potential of contactor 47 is changed by an amount $\Delta E_B$, this potential being algebraically combined with $E_B$ so as to maintain the relationship of Equation 16, namely, $E_3 = E_D - E_B$. The deviation of pointer 44 from the zero position is proportional to the quantity $\Delta E_B$, and consequently, if $\Delta E_B$ varies as does $\Delta E_3$, the gauge will accurately indicate variations in the weight per unit area of sheet material 12 from a standard value, independently of variations of the air column.

Figure 5:
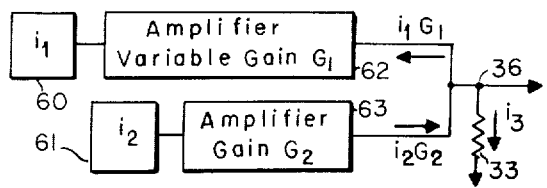
Fig. 5 is a block diagram of a modification of a portion of the circuit of Fig. 3.

An alternative arrangement for obtaining the condition of Equation 15 is schematically illustrated in Fig. 5, where blocks 60 and 61 respectively represent the source of currents $i_1$ and $i_2$; i. e., the detectors 14 and 13 and their associated sources. In this case the source strengths $S_1$ and $S_2$, and detection efficiencies $E_1$ and $E_2$ are made a convenient constant value for a predetermined constant differences in spacing between the sources 10 and 11 and their respective detectors, the currents $i_1$ and $i_2$ being separately amplified by a suitable factor to obtain the relationship of Equation 15. To this end, current $i_1$ is amplified in a variable gain amplifier 62 of gain $G_1$ to produce an output current $i_1G_1$ in the direction shown, and current $i_2$ is amplified in amplifier 63 of gain $G_2$ to produce output current $i_2G_2$. These amplified currents are differentially combined in resistor 33, producing a current therein of $i_3$ which develops a voltage thereacross which has previously been designated as $E_D$. In the calibration of the gauge, hot air may be blown through the air gaps to vary $\rho$, and the gain of amplifier 62 adjusted until $\Delta i_3/\Delta\rho=0$. The signal appearing at point 36 may then be indicated on a meter, or on a recorder as above-described in connection with Fig. 3. It will be understood, of course, that amplifier 63 may be of variable gain instead of amplifier 62, or both may be of variable gain, to permit adjustment of the relative magnitudes of currents $i_1$ and $i_2$ to obtain the conditions of Equation 15. Other arrangements will suggest themselves to ones skilled in the art, the principal criterion being to introduce, prior to algebraically combining the two currents, the factor by which sources 10 and 11 differ in spacing from their respective detectors.

While the system of Fig. 3 is disclosed as having two distinct sources 10 and 11, it is within the contemplation of the invention to utilize a single radioactive source in their stead, with the radiations therefrom collimated into two separate beams, one beam being directed through the sheet material so as to be intercepted by one of the detectors and the other beam being directed to be received by the other detector. As in Figs. 2 and 3, the detectors are unequally spaced from the source with the consequence that one beam traverses a longer air column than the other before being intercepted by its respective detector. The single source arrangement is particularly applicable to the system of Fig. 5 in which the conditions of Equation 15 may be realized by adjustment of the gain of amplifiers 62 (or 63), but its use is also possible in the system of Fig. 3 since suitable adjustment can be made of detector efficiencies, as above-described, to satisfy Equation 15. The important consideration, then, is the provision of two beams of radiation which traverse air columns of different lengths, whether they are from two separate sources or from a single source.

From the foregoing it is seen that applicants have provided a radiation-type thickness gauge which accurately indicates variations in thickness of sheet material from a desired thickness independently of variations which may occur in the density of the air in the gap between source and detector. While there have been shown and described and pointed out the novel features of the invention, it will be understood that various omissions and substitutions and changes in form may be made by those skilled in the art without departing from the spirit of the invention. It is the intention, therefore, to be limited only as indicated by the scope of the appended claims.

What is claimed is:

1. Apparatus for indicating variations from desired weight per unit area of a moving strip of sheet material comprising, in combination, first and second sources of penetrative radiation disposed on one side of the moving sheet material, first and second radiation detectors disposed on the other side of said sheet material and arranged to receive radiation from said first and second source, respectively, the spacing between said first source and its corresponding detector being greater than the spacing between said second source and its corresponding detector by a predetermined factor whereby the radiation from said first source traverses a longer air column than the radiation from said second source before reaching its respective detector, said detectors being positioned so as to simultaneously receive radiation passing through substantially the same area of the sheet material under test and each being operative to produce an output current which is a function of the weight per unit area of the sheet material and the weight of the air column separating it from its respective source, means for adjusting the relative magnitudes of said currents whereby upon subtraction of one from the other the effects of the air columns between said sources and detectors are eliminated, circuit means for differentially combining said currents, and means operative in response to the output of said circuit means for indicating variations in the weight per unit area of said material.

2. Apparatus for indicating variations from desired weight per unit area of a moving strip of sheet material comprising, in combination, first and second sources of penetrative radiation disposed on one side of the sheet material under test, first and second radiation detectors disposed on the other side of said sheet material and arranged to receive radiation from said first and second source, respectively, the spacing between said first source and its corresponding detector being greater than the spacing between said second source and its corresponding detector by a predetermined factor whereby the radiation from said first source traverses a longer air column than the radiation from said second source before reaching its respective detector, said detectors being positioned so as to simultaneously receive radiation passing through substantially the same area of the sheet material under test and each being operative to produce an output current which is a function of the weight per unit area of the sheet material and the weight of the air column separating it from its respective source, first and second current amplifiers respectively connected to said first and second detectors, at least one of said amplifiers having adjustable gain whereby said output currents may be adjusted in magnitude in proportion to said predetermined factor, circuit means connected to said amplifiers for differentially combining said amplifier currents, and means operative in response to the output of said circuit means for indicating variations in the weight per unit area of said material independently of air column variations.

3. Apparatus for indicating variations from desired weight per unit area of a moving strip of sheet material comprising, in combination, first and second sources of penetrative radiation disposed on one side of the sheet material under test, first and second radiation detectors disposed on the other side of said sheet material and arranged to receive radiation from said first and second source, respectively, the spacing between said first source and its corresponding detectors being greater than the spacing between said second source and its corresponding detector by a predetermined factor whereby the radiation from said first source traverses a longer air column than the radiation from said second source before reaching its respective detector, said detectors being positioned so as to simultaneously receive radiation passing through substantially the same area of the sheet material under test and each being operative to produce an output current which is a function of the weight per unit area of the sheet material and the weight of the air column separating it from its respective source, first and second current amplifiers respectively connected to said first and second detectors, circuit means connected to said amplifiers for differentially combining the output currents therefrom, the gain of at least one of said amplifiers being adjustable over a range such that the variations in the difference between the output currents therefrom as a function of changes in the density of the air column between said sources and detectors may be made equal to zero, and means operative in response to the output of said circuit means for indicating the weight per unit area of said material independently of air column variations.

References Cited in the file of this patent

UNITED STATES PATENTS

| 2,264,725 | Shoupp et al. | Dec. 2, 1941 |
| 2,513,818 | Roop | July 4, 1950 |